Aug. 16, 1938.  B. F. FITCH  2,127,481
APPARATUS FOR TRANSFERRING FREIGHT
Filed Jan. 15, 1935  6 Sheets-Sheet 1

Aug. 16, 1938.　　　B. F. FITCH　　　2,127,481
APPARATUS FOR TRANSFERRING FREIGHT
Filed Jan. 15, 1935　　6 Sheets-Sheet 3

Inventor
Benjamin F. Fitch,
By Bates, Golrick & Fears
Attorneys

Aug. 16, 1938.    B. F. FITCH    2,127,481
APPARATUS FOR TRANSFERRING FREIGHT
Filed Jan. 15, 1935    6 Sheets-Sheet 4

Inventor
Benjamin F. Fitch
By Bates, Goldrick & Teare
Attorneys

Aug. 16, 1938.   B. F. FITCH   2,127,481
APPARATUS FOR TRANSFERRING FREIGHT
Filed Jan. 15, 1935   6 Sheets-Sheet 5

Inventor
Benjamin F. Fitch,
By Bates, Golrick & Fears
Attorneys

Patented Aug. 16, 1938

2,127,481

UNITED STATES PATENT OFFICE 2,127,481

APPARATUS FOR TRANSFERRING FREIGHT

Benjamin F. Fitch, Greenwich, Conn., assignor to Motor Terminals Company, New York, N. Y., a corporation of Delaware Application January 15, 1935, Serial No. 1,926

17 Claims. (Cl. 214—38)

This invention relates to an apparatus for transferring demountable freight containers from an automotive truck to a railway car or shipper's platform, or vice versa. At the present time I advantageously employ a system of overhead traveling cranes in which I utilize cranes to raise a container from a truck and transfer it to a platform or railway car. In certain instances I have found it desirable to supplement the crane-handling system by a system which eliminates the expense incurred by crane installations at the lesser used points of interchange, as, for instance, at a small shipper's platform, where only an occasional container is transferred. Under such latter circumstances I prefer to arrange the containers and the carriers so that they may be handled by cranes in the usual manner at points of frequent interchange and yet may be slid from the car or platform to the vehicle or vice versa. Such a system for handling freight containers at the minor points of interchange is described and illustrated in my copending application for Letters Patent Serial No. 755,752, filed in the United States Patent Office the 3rd day of December, 1934.

When it is desirable to supplement the crane-handling system with other methods of transfer, I prefer to provide the container and the carriers with coacting members to guide the container, for a horizontal sliding movement, from one surface to another. I prefer to utilize a mechanism operable by the power plant of the automotive truck or tractor for sliding the container, either from the truck to the car or platform, or vice versa.

In such systems it becomes highly advantageous to so construct the mechanism for moving the container from the truck to the platform or vice versa, that the mechanism will, to a great extent, be carried by the truck, eliminating the necessity for installing any material amount of permanent equipment at the various platforms, and minimizing the expense of installation.

I prefer to accomplish the object of this invention by providing a highway vehicle, such as a truck or trailer with a continuous chain mechanism which may be attached to the container on the platform and operated by the power plane of the truck to draw the container by a horizontal sliding movement onto suitable guides carried by the vehicle; or may be operated in a reverse direction to shove the container from such vehicle onto the platform. This, therefore, is a more specific object of the invention.

A further object of the present invention is to so arrange the transferring mechanism that it may be projected beyond the edges of the truck into engagement with suitable devices carried by the platform or car, or may be positioned within the confines of the truck or trailer so as to minimize the maximum size of the truck and permit a container of substantially the same size as the vehicle to be readily positioned thereon and transported from place to place.

Other objects of the present invention will become apparent from the following description, reference being had to the accompanying drawings which illustrate a preferred embodiment of the invention. The essential features of the invention will be fully set forth in the claims.

Referring now to the drawings.

Figures 1, 2, 3:
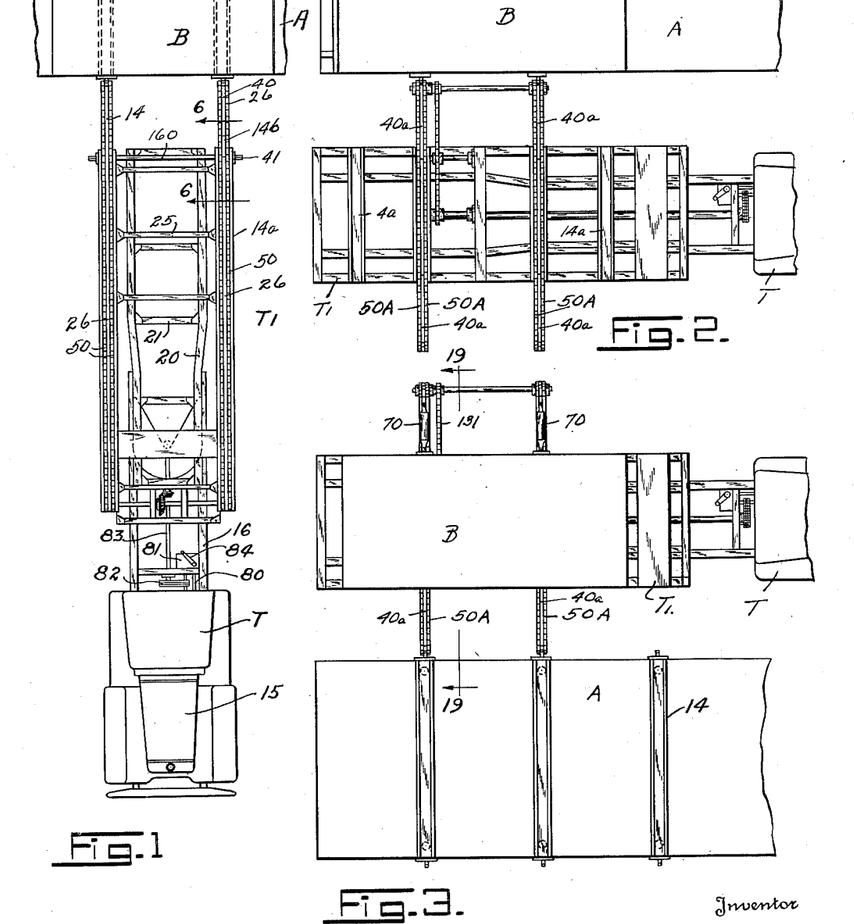
Fig. 1 is a plan view illustrating an automotive vehicle in position adjacent a railway car or platform, ready to receive a container from the car platform.
Fig. 2 is a view similar to Fig. 1, illustrating a modified form of trailer in which the body or container is slid crosswise onto the trailer.
Fig. 3 is a view similar to Fig. 2, but illustrating the body in position on the trailer.
Figure 4:
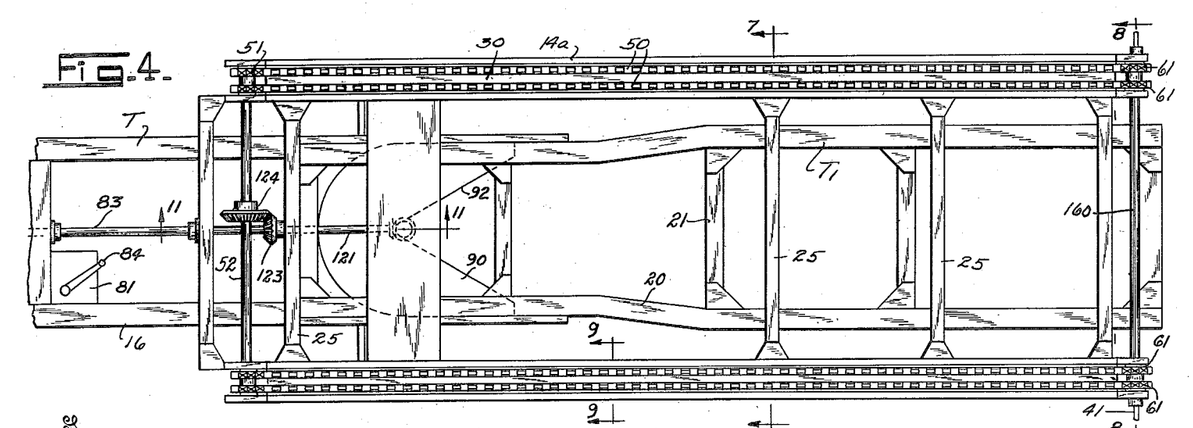
Fig. 4 is an enlarged fragmentary plan of a truck and trailer.

As heretofore mentioned, this invention is especially adapted for use in a system for transferring freight containers by sliding or skidding the container horizontally between a truck or trailer and a railway car or platform. As shown in Fig. 1, I have illustrated a platform A which may comprise either the usual shipper's platform or the platform of a railway car. As there shown, the automotive carrier comprises a truck or tractor T, which draws a detachable trailer T1. The truck unit has previously been positioned adjacent to the railway car and a bridge mechanism 40 for interconnecting the car with the trailer has been positioned therebetween. The body B, shown in position on the platform, is to be skidded from the platform onto the trailer by a power mechanism carried by the truck and operatively connected to suitable transferring mechanism mounted on the trailer and which extends along the interconnecting bridge between the trailer and the platform.

Figure 9:
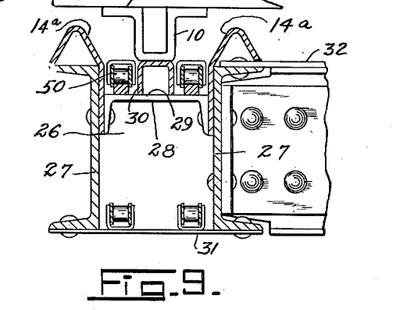
Fig. 9 is an enlarged sectional detail, the plane of the section being indicated by the line 9—9 on Fig. 4.
Figure 10:
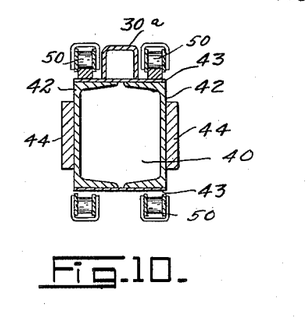
Fig. 10 is a sectional detail indicated by the line 10—10 on Fig. 6.

The body B comprises the usual rectangular container having side and end walls supported by a suitable frame. Rigidly secured to the bottom of the frame and extending downwardly therefrom are a series of inverted rails 10. As shown in Fig. 9, each rail comprises a flat-bottomed, inverted pressed metal U having flanges 11 which are secured, by any suitable means, to the lower face body frame, and which are arranged to slide in suitable channels or guideways 14 carried by the platform or railway car and similar guideways 14a on the automotive carrier. The guides 14 and 14a serve to guide and maintain the body in proper position on the carrier.

Figure 5:
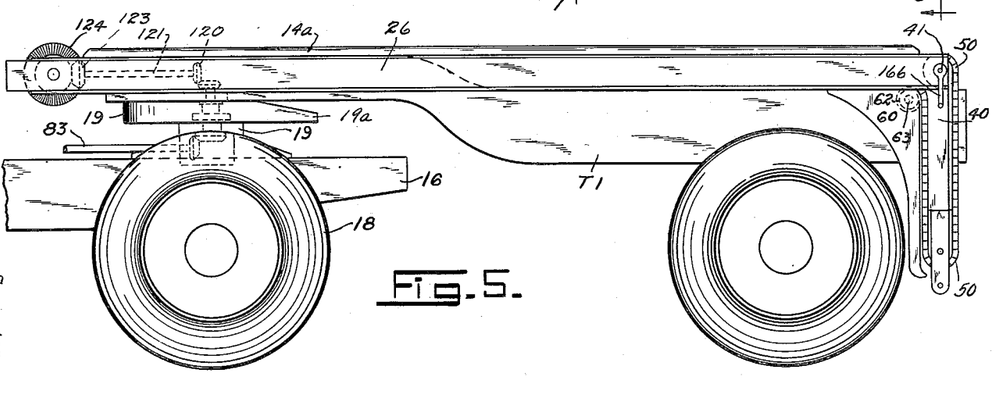
Fig. 5 is a fragmentary side elevation of the truck and trailer unit illustrated in Fig. 4.

I will first describe in detail the truck and trailer as illustrated in the drawings, and especially with reference to Figs. 1 and 4 to 10, inclusive. As there shown, the truck proper comprises the usual motor and cab unit 15, mounted on a chassis frame 16, supported by suitable dirigible forward wheels (not shown) and suitable rear driving wheels 18 (Fig. 5). The truck chassis carries one member of a trailer connecting device 19, the other member of which is detachable therefrom and is carried by the trailer T1.

While I have illustrated a combined tractor and trailer unit wherein the trailer may be detached from the tractor as desired by the operator, it is obvious that I may employ a single automotive unit, such as the usual truck, or I may employ a four-wheel trailer arranged to be drawn from place to place by a suitable tractor truck. I prefer, however, to use a tractor and trailer unit, as such a construction enables me to transport containers carrying a maximum weight from place to place, while complying with the usual highway rules and regulations.

The trailer T1 comprises the usual longitudinal chassis frame members 20, which are connected together by suitable cross-frame members 21, and adjacent their forward ends carry the trailer connecting device 19a, which connects the trailer with the truck or tractor.

The channels or guides 14a are, as heretofore mentioned carried by the trailer. Supported by the chassis frame 20, and extending transversely thereof, are a series of frame members or beams 25 which extend beyond the sides of the longitudinal frame members 20 and have secured to their opposite outer ends box-girder constructions 26.

Each girder 26 comprises a pair of oppositely facing channels 27, the inner channel of which is secured by suitable angle clips to the beams 25. The channels of each girder are secured together in a spaced relationship by an inverted channel member 28, forming in the upper portion of the girder member a longitudinal recess 29, which carries a rail 30, adapted to coact with the body rail 10. The rail 30 is spaced apart to form longitudinally extending seats 33, through each of which, a chain 50 passes, as will be hereinafter described in detail. A suitable plate member 31 is secured to the lower flanges of the channels 27 and completes the girder construction, and provides a support for the lower stretches of the chains 50. Suitable bracket members 32 are secured to the trailer frame members 20 and to the girder members 26, to provide a rigid support therefor. Other suitable bracing, such as gusset plates 32 and the like complete the tie between the girders and the trailer frame.

As heretofore mentioned, the bodies B are slid from the platform to the trailer and vice versa by a power-operated mechanism carried by the trailer. Such mechanism includes the chains 50, heretofore mentioned. As shown, there are a pair of chains 50 mounted on each girder 26, and so positioned that they lie substantially beneath the body rails 10, when the body is in position on the trailer.

The chains 50 are, as indicated in Figs. 4, 5, 6 and 9, continuous loops which, adjacent their forward ends, pass around suitable sprockets 51 carried by a transverse shaft 52 journalled in suitable bearings carried by the trailer, and at the rear ends they pass around sprockets carried by the interconnecting members 40.

The interconnecting or extension members 40 are pivoted to a transverse shaft 41 journalled in the girders 26 of the trailer frame and hereinafter to be described more fully. Each extension member 40 comprises a pair of inwardly facing channel members 42, secured together at their upper and lower surfaces by suitable plate members 43. The upper plate 43 carries an inverted channel 30a which, when the extension member is raised to the position shown in Fig. 6, forms a continuation of the rail 30 carried by the girders 26 of the trailer.

Figure 6:
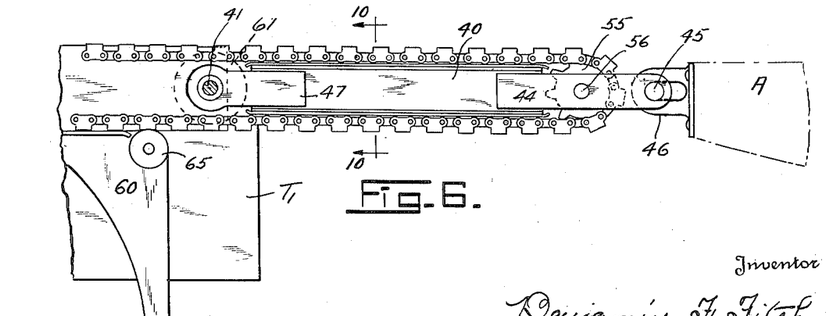
Fig. 6 is a vertical section as indicated by the lines 6—6 on Fig. 1.
Figure 7:
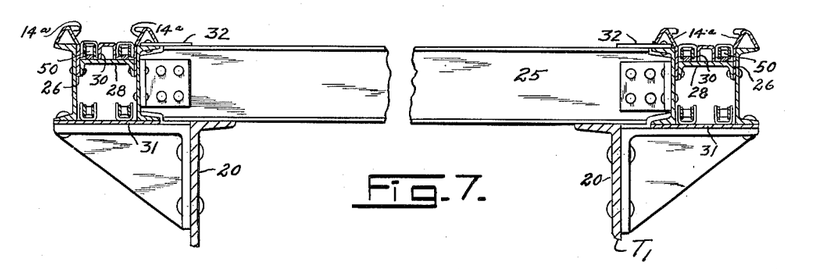
Figs. 7 and 8 are transverse sections through the trailer as indicated by the correspondingly numbered lines on Fig. 4.

Each extension member 40 is arranged to be connected with the platform A. As shown in Fig. 6, the channels 42, of each extension member 40 have rigidly secured thereto a bar 44. Extending between the bars of each member is a removable pin 45 arranged to engage a hook or clevis member 46, carried by the platform A, thereby providing a ramp or interconnecting member between the trailer and the platform. The chains 50 extend rearwardly from the trailer and are looped around suitable sprockets 55 carried by shafts 56 mounted between the bars 43 of their respective extension members, thus enabling the chains to extend some distance from the rear of the trailer to a point adjacent to the edge of the platform A. At the forward end of the interconnecting members 40 I provide bars 47 which connect the members to the pivot shaft 41, heretofore mentioned.

The interconnecting members 40 are pivoted to the trailer by bars 47 which extend inwardly toward the trailer and are swingably mounted on the shaft 41, heretofore mentioned. Thus, they are pivotally mounted to both the trailer and platform, so that any difference in elevations of the platform or trailer, during the transfer of the container, due to spring deflection, will not place any of the mechanism under an excessive strain.

During the transportation or movement of the trailer from point to point, the interconnecting members 40 are rocked about their pivots, namely, the shaft 41, to vertical positions, shown in Fig. 5, where they rest against suitable fender members 60, which are secured to the truck in any suitable manner. When in this position the upper stretch of each chain 50, passes around and is supported by sprockets 61 rotatably mounted on the shaft 41, heretofore described, while the slack in each chain is taken up by sprocket or roller member 62 mounted, as indicated in Fig. 5, on suitable shafts 63 carried by the fenders 60. Any suitable means, (not shown) may be used to retain the interconnecting bridge member 40s in its lowered position.

Figures 18, 20, 21:
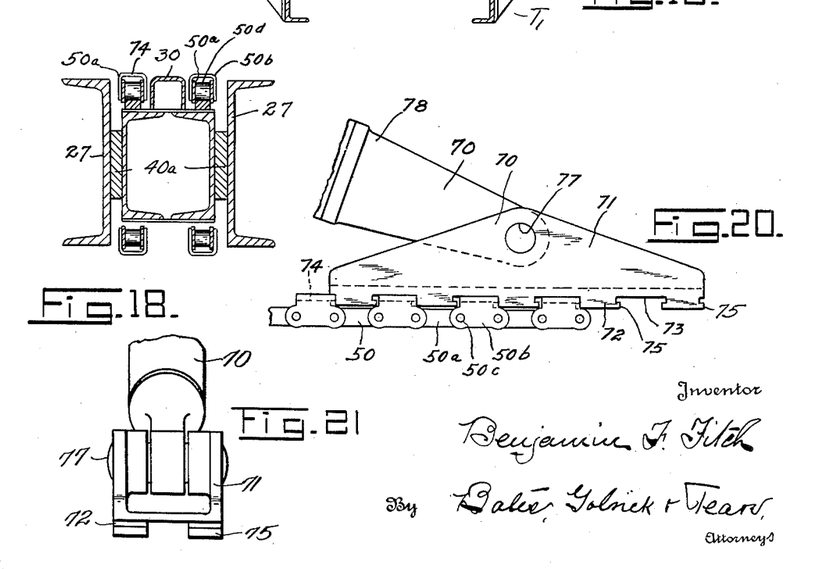
Fig. 20 is an enlarged fragmentary detail of a shoe for interconnecting the container to the operating mechanism.
Fig. 21 is a end view of the connecting shoe and bar shown in elevation in Fig. 20.

The chains 50 are so arranged that they may be readily connected to a container by a container connecting or pusher member 70, shown in Fig. 20. The pusher member comprises a casting 71 provided with a series of downwardly facing ribs 72, forming between the ribs transversely extending recesses 73. Each chain 50 is of the roller type and comprises alternate links 50a and 50b connected by suitable pins 50c upon which are mounted rollers 50d (Fig. 18). The links 50b comprise U-shaped metal plates having downwardly depending walls interconnected by a top wall 74 which extends upwardly some distance above the plane of the links 50a and the rollers. The wall 70 of each link 50b is arranged to be engaged by the end walls of the recesses 73 of the pusher member 71. Suitable projections 75 on the ribs 72 of the member 71 are arranged to seat beneath the upper walls 74 of the links 50b to prevent inadvertent separation between the member 71 and the chain 50. The space between each pair of links 50b is such that the ribs 72 of the pusher may extend therein and consequent upon the relative movement between the chain and the member the interengagement above mentioned will take place.

The container connecting member 70, as heretofore mentioned, forms an interconnecting device between the propelling chain 50 and the container. This member is in the form of a semi-rigid link. As shown, pivoted to the casting 71 as at 77 is a rigid link member 78, the other end of which is provided with an eye which may be pivotally connected to a clevis C carried by the container, as indicated at 79 in Fig. 19. Thus, it will be seen that the connecting member 70 may be used either to push or shove the container from the truck or trailer onto the platform, or may be used to pull or draw the container from the platform to the trailer.

The chains 50 are operated by the motive power unit of the truck. As indicated in Fig. 1, the motor of the truck is connected in the usual manner, by a suitable drive shaft 80, with a supplemental transmission 81 which in turn is connected by any suitable driving means, such as a sprocket and chain mechanism, generally indicated at 82, with a longitudinally extending shaft 83 carried by the truck chassis. A suitable hand lever 84 is provided so that the operator may readily control the operation or movements of the shaft 83.

I have so arranged the chain driving mechanism that it is automatically connected and disconnected with the truck consequent upon the removal or attaching of the trailer to the truck. To this end I prefer to make the power connection through the medium of a vertical shaft passing through the pivot of the trailer connecting member 19.

The trailer connecting member 19 and the power connection between the truck and trailer are best illustrated in Figs. 4, 5, and 11 to 14, inclusive. As there shown, the interconnecting member comprises a shoe 90 having a central opening 91 which is intersected by a V-shaped opening 92 extending toward the rear of the truck. The shoe 90 is pivoted to the truck by suitable pivot pins 93, which pass through downwardly extending flanges 94 on the shoe and engage suitable bearing brackets 96 carried by the truck.

Figure 11:
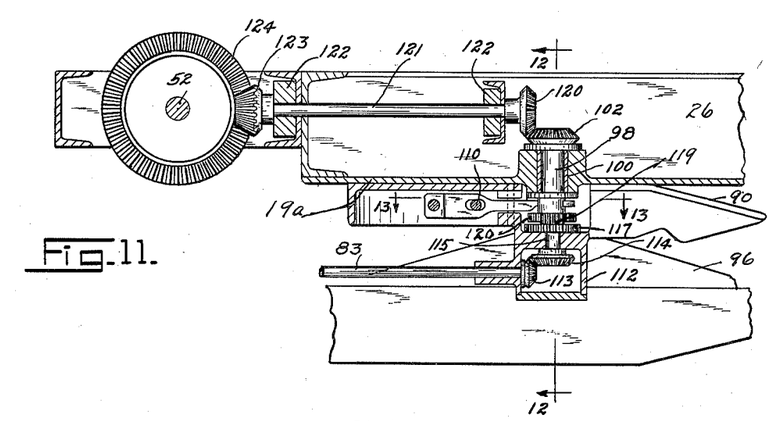
Fig. 11 is a fragmentary vertical section on an enlarged scale illustrating a power connection between the truck and the trailer, the plane of the section being indicated by the line 11—11 on Fig. 4.
Figure 12:
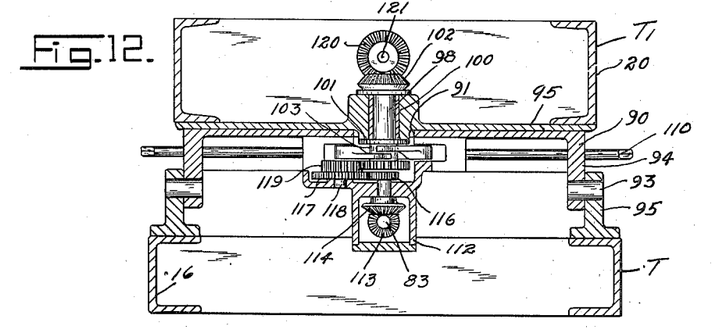
Fig. 12 is a vertical transverse section as indicated by the line 12—12 on Fig. 11.
Figure 13:
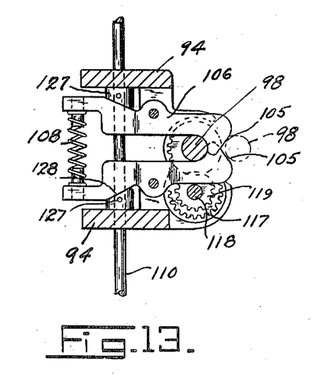
Fig. 13 is a horizontal sectional detail as indicated by the line 13—13 on Fig. 11.
Figure 14:
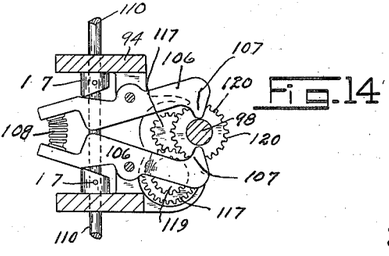
Fig. 14 is a detail similar to Fig. 13, but illustrating certain parts in a different operating position.
Figure 15:
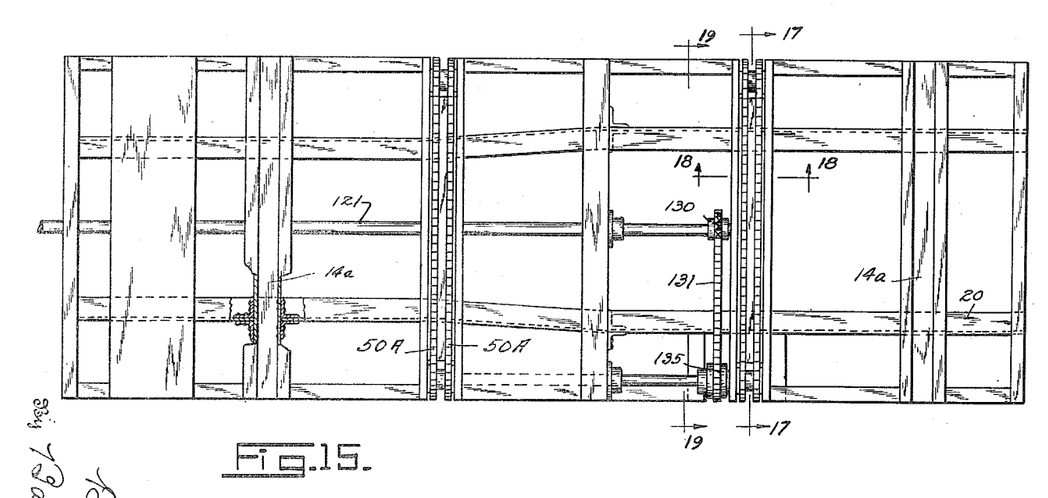
Fig. 15 is a fragmentary plan view, on an enlarged scale, of the modified form of trailer illustrated in Figs. 2 and 3.
Figure 16:
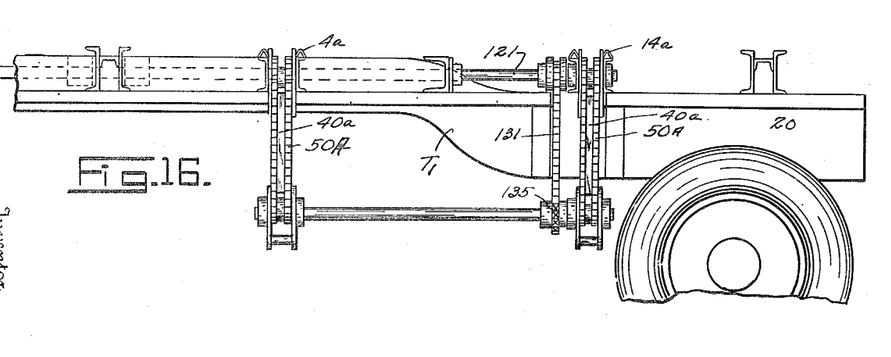
Fig. 16 is a fragmentary side elevation of the trailer shown in Fig. 15.

The trailer T1 is provided with a shoe 95, adapted to engage the shoe 90, and which is secured to the trailer frame members 20, as shown in Figs. 11 and 12. The shoe 95 has a downwardly depending, axially positioned shaft 98, arranged to enter the recess 92 and be cammed by the flaring side walls thereof into the recess 91, consequent upon the rearward movement of the truck relative to the trailer. As shown in Fig. 12, the shaft 98 is mounted in a suitable bearing 100 carried by the shoe 95 and is restrained from axial movement therein by a collar 101 on the lower end of the shaft, which engages the lower face of the bearing 100 and a bevel gear 102 which is secured to the shaft adjacent its upper end and engages the upper surface of the bearing.

The trailer is retained in position on the truck by a pair of hooks carried by the shoe 90 of the truck. As shown in Fig. 11, the downwardly extending portion of the shaft 98 is provided with an enlarged portion 103, which, consequent upon the rearward movement of the truck, engages the bevelled ends 105 of a pair of pivoted hooked members 106 (Fig. 13) and operates to spread the hooked members to the position shown in Fig. 14. As the shaft 98 passes the hooked portions 107 of the hooks 106, a suitable spring 108 acts to bring the hooked members to the position shown in Fig. 13, whereupon the hooks act to retain the shaft 98, and through it, the trailer T1 in position on the shoe 90.

To accomplish the release of the trailer, I provide a rod 110 which extends through and is carried by the flanges 94 of the shoe 90 and is provided with a pair of cams 127 arranged to engage bevelled surfaces 128 of respective hook members 106. These cams are so arranged that consequent upon the rotation of the shaft 110 they will spread the hook or jaw portions 107 of the hooks sufficient to permit the truck to move away from the trailer.

The driving connection between the power shaft 83 of the truck and the chains 50 includes the shaft 98. As shown in Fig. 11, the shaft 83 extends rearwardly from the transmission 81 into a gear box 112 carried by the shoe 90. Suitable flexible couplings (not shown) permit the swinging movement of the shoe and gear box. The shaft 83 is provided with a bevelled pinion 113 which constantly meshes with a pinion 114 carried by a vertical shaft 115. The shaft 115 is journalled in the gear box 112 and is provided, at its upper end, with a gear 116 which meshes with a spur gear 117 carried by a stub shaft 118 mounted on the gear box 112. A suitable pinion 119 drivingly connected with the gear 117 and mounted on the shaft 118 is arranged to normally mesh with a gear 120, which is drivingly secured to the lower end of the shaft 98 of the trailer connecting pivot member.

The arrangement, above described, is such that as the truck moves, relative to the trailer, the gears 119 and 120 slide into and out of mesh with each other. The pinion 102, heretofore referred to as mounted on the upper end of the shaft 95, is therefore separably coupled with the power mechanism of the truck. The pinion 102 meshes with a bevel gear 120 carried by a longitudinally extending shaft 121 mounted in suitable bearings 122 carried by the trailer frame, and drivingly secured thereto, is a bevelled pinion 123 arranged to mesh with a bevel gear 124 carried by the transverse shaft 52, heretofore mentioned as drivingly supporting the sprockets 51, around which the forward ends of the body propelling chains 50 are looped. Hence, consequent upon the application of power to the shaft 83 the chains 50 will be progressed and depending upon the position of the transmission mechanism 81, (which includes the usual reverse gear mechanism), the upper stretch chains may readily be progressed either forwardly to draw a body under the trailer or rearwardly to shove a body from the trailer.

I have so arranged the extension members 40 which interconnect with the truck and the platform to form a bridge therebetween that they swing upwardly from the position shown in Fig. 5 to the position shown in Fig. 6 by the power unit of the truck. As shown in the drawings, and especially in Fig. 8, the sprockets 61 around which the chain 50 passes, at the pivot point of the interconnecting members 40, are loosely mounted on the shaft 41. The shaft 41 is journalled in a tube sleeve 160 which in turn is journalled in bearings 161 integrally secured to the innermost channel members 27 of each girder 26. The ends of the bars 47, of each member 40, are mounted on the shaft 41 between a sprocket 61 and the sleeve 160 or a sleeve 162. The latter sleeves form bearings for the outermost ends of the shaft 41 and are rotatably mounted in blocks 163 secured to the outer faces of the outermost channels 27.

Figure 8:
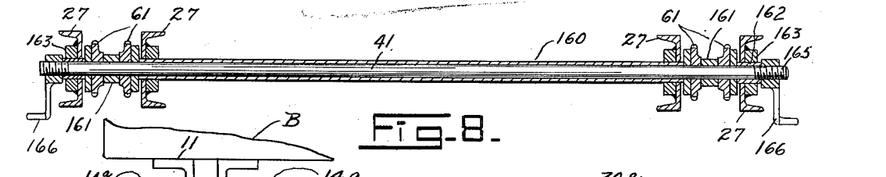

As shown in Fig. 8, the ends of the shaft 41 are provided with threads 165 which are adapted to be engaged by suitable removable crank members 166. Hence, consequent upon the operation of one of the crank members 166, the sleeves 160 and 162, the sprockets 61, and the bars 47 of the connecting members 40, may be drawn into frictional contact with each other and clamped to rotate as a unit with the shaft 41. Hence, consequent upon the forward movement of the upper stretch of the chain 50, which will rotate the sprockets 61, the shaft 41 will be swung, raising the bridge or connecting members 40.

The arrangement just described is such that the bridge members 40 may be raised into such position that, as the truck moves rearwardly registration will be effected between the members 40 and the cooperating anchoring members 46 on the platform, whereupon the pin 45 may be inserted to connect the trailer and platform. I have shown the opening in the anchorage member 46 slotted to allow leeway in the approach of the trailer to the platform. Thereafter the crank members 166 may be rotated to loosen the assembly, permitting the sprocket 61 to rotate freely on the shaft assembly so that further operation of the sprocket chains will not affect the members 40.

In place of attaching the members 40 to the platform by the removable pin 45 illustrated in Fig. 6, I may permanently attach the pin 45 to the members 40 and make the anchorage member 46 an upwardly facing hook, in which case before the truck completes its rearward movement the bridge members may be tipped up slightly by the action of the chains described, the pin 45 brought over the mouth of the hook by the backing movement of the truck; then the loosening of the shaft assembly will allow the pin to drop into the hook, where it may be retained by any usual closure member for the hook, as for instance a pin passing through the upper portion of the hook transversely of the pin 45.

After the bridge members 40 have been positioned between the trailer and the platform, the container connecting link members 70 are attached to the chains 50. As shown, there are two links 70 which engage the respective pairs of chains 50 at opposite sides of the trailer frame and which are attached to the end of the trailer adjacent opposite sides thereof.

When the links 70 have been positioned as above mentioned the power mechanism is operated to progress the chain 50 and cause the container to be drawn onto the truck. After the container has been fully positioned on the truck, the chain 50 will fall away from the shoe 71 as the former passes around its forward supporting sprockets 51, thereby automatically disengaging the chain from the body. Similarly, when the body is being shoved from the truck the chain, as it passes around the rearmost sprockets 55, will fall away from the shoe 71, again automatically disengaging the shoe from the chain and preventing damage to the mechanism in case the operator should fail to operate the clutch before the shoe reaches the extreme limits of the chain.

Figures 17, 19:
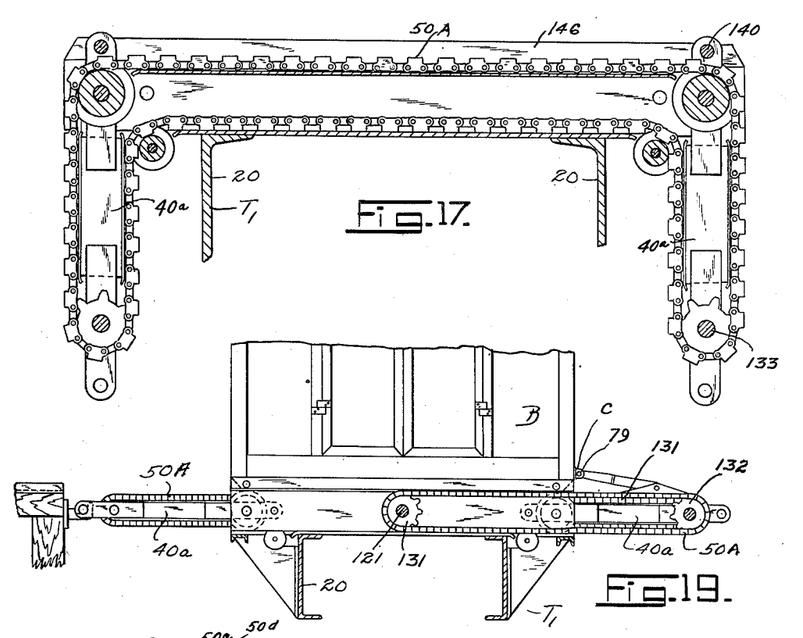
Figs. 17 and 18 are transverse vertical sections as indicated by the correspondingly numbered lines on Fig. 15.
Fig. 19 is a transverse section as indicated by the line 19—19 on Figs. 3 and 15.

The construction so far described contemplates the movement of the body horizontally endwise of the truck. As shown in Figs. 2 and 3, it will be seen that I also contemplate sliding the body sideways to and from the truck. In this instance I provide chains 50a which are, as shown in Fig. 17, similar to the chains 50 heretofore described. The chains 50a extend crosswise of the truck, in girder-like constructions similar to the girders 26, heretofore described, except that they are supported on and extend transversely of the trailer frame members 20.

When the chains are mounted crossways of the trailer, both the forward and rearmost ends thereof are provided with pivoted bridge members 40a which may be raised and lowered in a manner similar to that heretofore described in connection with the bridge members 40. By providing these bridge members at both sides of the trailer, I enable a body to be moved on and off of the truck across either side thereof. This also enables the positioning, on the truck, of a body substantially the same width as the truck while maintaining the truck of a minimum size.

The power connection to the chains 50a is made through the trailer connecting device 19a as heretofore described in connection with Figs. 1, 11 and 12. However, the trailer power shaft 121 extends rearwardly from the connecting device and carries thereon a suitable sprocket 130 which, through the medium of a driving chain 131 and a sprocket 132, operates to drive a shaft 133 around which the outer end of one side of the chain is looped, such shaft being journalled in suitable bearings carried by a right-hand extension member 40a (Fig. 17).

To permit the swinging of the extension member 40a without causing undue slack in the chain 131 I may provide suitable sprockets 135 which support the chain in a manner similar to the sprockets 61 and 65, heretofore mentioned in connection with the chain 50. Thus, it will be seen that I may pivot both extension members 40a to a vertical position within the confines of the trailer frame, depending downwardly below the container mounted thereon. Any suitable means such as pins 140, which pass through the members 40a and the guide rails of the channel 14a, may be used to maintain the members 40a in their vertical position during the movement of the truck from place to place.

While I have not shown in detail any specific mechanism for locking the container onto the trailer, I contemplate using any of the forms of mechanisms shown in my copending application heretofore mentioned. It will be apparent from the description that I have provided a power apparatus adapted to be carried by a truck or trailer for mechanically sliding demountable freight containers from a truck or trailer to a railway car or shipper's platform. The mechanism is so arranged that the shipper's platform need not be provided with special equipment which remain a stationary part thereof. At the most, all that is required for the shipper's platform is a pair of channel members to serve as guides for the container rails. However, even these may be omitted, if the platform surface be of sufficient rigidity as to support the container during its sliding movement, without danger to the surface of the platform.

I claim:

1. The combination of a highway truck having spaced channels, a demountable body having spaced rails on its underside adapted to occupy respective channels, means for skidding said body to and from the truck, said means including looped chains arranged to have one of their stretches lie in said channels at either side of respective body rails when the body is positioned on the truck, and a pair of shoes, each of which is arranged to be removably connected with the body and with respective chains, whereby the movement of the chains may slide the body to or from the truck, and a power mechanism carried by the truck and operatively connected to said chains to cause them to be moved.

2. The combination of a truck having a load-supporting surface, an extension pivotally secured to the load supporting surface, a flexible chain member looped at one end about said extension at a point distant from said pivotal connection and looped at the other end about the truck at a point distant from said pivotal connection, means to progress said chain, means to interconnect the chain with a load whereby the load may be drawn onto or off from the truck across the extension as desired, a sprocket member having its axis in substantial alignment with the pivotal connection between the extension and the truck and arranged to engage the chain, means to connect said sprocket member and extension together as a unit, whereby the extension may be swung about its pivot consequent upon the operation of said chain.

3. The combination of a demountable freight container, a vehicle, a platform, bridge members pivotally connected at one end to respective sides of the vehicle, one of said members having its other end arranged to be connected to said platform, and form a continuation of the load supporting surface of the vehicle, a flexible member looped about said members and extending across and transversely of the truck, power-operated means carried by the truck and arranged to selectively progress the said flexible members either toward or from the platform, and a connecting member arranged to be inter-connected between the flexible member and a container, whereby movement of the flexible member will cause the body to be slid onto or off of the truck, as desired.

4. A power operated vehicle, having a load-supporting surface onto which a load may be slid, a pair of bridge members pivotally connected to respective sides of the vehicle and arranged to form extensions of the load supporting surface thereof, and power-operated means carried by the vehicle extending across the load-supporting surfaces of both the vehicle and the extensions, the operation of which means may cause a load to be moved onto or off of the vehicle.

5. The combination of a highway truck, having a guideway for a demountable body adapted to be moved on and off of the truck, a bridge member arranged to be connected between the truck and a platform, the bridge member forming a continuation of said guideway on the truck, a flexible member looped at one end about means carried by the truck and looped at the other end about means carried by the bridge member, power mechanism carried by the truck and arranged to progress said flexible member, and means whereby the movement of the flexible member may slide a body along said guideway onto or off of the truck dependent upon the direction of movement of said member.

6. The combination of a highway truck having guides thereon, a bridge member having a guide and arranged to be pivotally connected between the truck and a platform, the guides of the bridge member forming a continuation of the guides of the truck, a chain looped at one end about means carried by the truck and looped at the other end about means carried by the bridge member, power mechanism carried by the truck and arranged to progress said chain, a demountable body having supporting members adapted to coact with said guide, and means to connect said chain with said body, whereby said power mechanism may slide the body on or off of the truck, dependent upon the direction of the progress of said chain.

7. The combination of a vehicle adapted to support a demountable freight container and two bridge members pivotally carried by the vehicle and adapted for independent elevation for attachment of their free ends to a support, and body propelling mechanism on said bridge members.

8. The combination of a vehicle having two parallel guides adapted to support a demountable freight container, and two independent bridge members pivotally carried by the vehicle and adapted to form in effect continuations of said guides, and body propelling mechanism on said bridge members.

9. The combination of a vehicle having a pair of parallel guides for a demountable body, a pair of bridge members pivotally carried by the vehicle and adapted to form continuations of said guides, chains on said vehicle extending also onto the bridge members, means for propelling the chains, and means for attaching a demountable body to the chains.

10. The combination of a vehicle provided with a pair of parallel, upwardly facing channels, a demountable body having skid rails adapted to occupy said channels, bridges carried by the vehicle and adapted to register with the channels and at their far ends engage a suitable support, and propelling chains on the truck extending parallel with the channels and along the bridges.

11. The combination of a vehicle, a pair of upwardly facing channel shaped guides extending lengthwise of the vehicle and placed parallel with each other and adapted to receive supporting members on the underside of a demountable body, a pair of independently movable bridge members pivoted to the rear end of the vehicle and adapted to be brought into substantial alignment with said channel shaped guides and form guideways thereto, and a pair of propelling chains mounted on the vehicle parallel with the channel guides extending also along the bridge members and looping around the pulleys adjacent the far end of the bridge members, means for connecting said chains with a demountable body, and power mechanism on the vehicle for operating the chains to move the body onto or off the vehicle across the bridge members.

12. The combination of a vehicle adapted to carry a demountable body, a bridge pivotally carried by the vehicle, the free end of the bridge being adapted to be attached to a support, a body propelling chain on the vehicle extending also across the bridge, and means for driving the chain substantially at the free end of the bridge.

13. A vehicle adapted to carry a demountable container, a chain on the vehicle, means for operating it to propel the container, said chain extending transversely of the vehicle and depending in loops at opposite sides thereof, each loop being carried by a bridge member pivoted to the vehicle adjacent the side, either bridge member being adapted to be raised to form a continuation from the vehicle to a suitable support, means on the vehicle for propelling the chain, and means for attaching the chain to the container.

14. A vehicle having transversely extending guides for positioning a demountable container, endless chains on the vehicle extending transversely thereof, said chains depending in loops at opposite sides of the vehicle, said loops being carried by bridge members pivoted to the vehicle adjacent the sides, either bridge member being adapted to be raised to form a continuation from the vehicle to a suitable support, and means on the vehicle for driving the chains substantially at the free end of one of the bridges, and means for attaching the chains to the container.

15. The combination of a platform, a highway truck having a pair of parallel guides thereon for a demountable body adapted to be carried by the truck, a pair of bridge members pivotally connected at one edge to the truck in registration with the guides and having their other ends arranged to be connected to said platform, flexible members looped at one end about means carried by the truck, and having their other ends looped about means carried by the bridge members, power-operated means carried by the truck and arranged to selectively progress the said flexible members, and connecting members arranged to be inter-connected between the flexible members and the body, whereby movement of the flexible members will cause the body to be slid onto or off of the truck, across the bridge members.

16. A power-operated vehicle, having a load-supporting surface onto which a load may be slid while the surface is stationary, a bridge member pivotally connected to one edge of the vehicle and arranged to form an extension of the load-supporting surface, a power-operated chain carried by the truck and extending substantially parallel with the load-supporting surfaces of both the truck and the extension, the operation of which chain may cause a load to be moved onto or off of said truck surface, the pivotal connection between the extension and the truck being so arranged that the extension may be moved to a position within the confines of the truck, and means whereby the operation of said chain may move the extension to and from such position to a position where it forms a continuation of the load-supporting surface of the truck.

17. The combination of a truck having a stationary load-supporting surface for a body moved onto or off of the truck, an extension pivotally secured at one end of the load-supporting surface and arranged to form a continuation of said surface, said pivotal connection permitting said extension to be swung to a position normal to the load-supporting surface, whereby the overall dimension of the truck while traveling is maintained at a minimum, a flexible chain member looped at one end about said extension at a point distant from said pivotal connection and looped at the other end about the truck at a point distant from said pivotal connection, means to progress said chain, a movable freight container adapted to rest on said load-supporting surfaces and be guided thereby, and means to interconnect the chain with the container, whereby a container may be moved onto or off of the truck across the extension.

BENJAMIN F. FITCH.